May 27, 1924.
R. STRESAU
1,495,272
PROCESS AND APPARATUS FOR ARC WELDING
Filed July 17, 1920
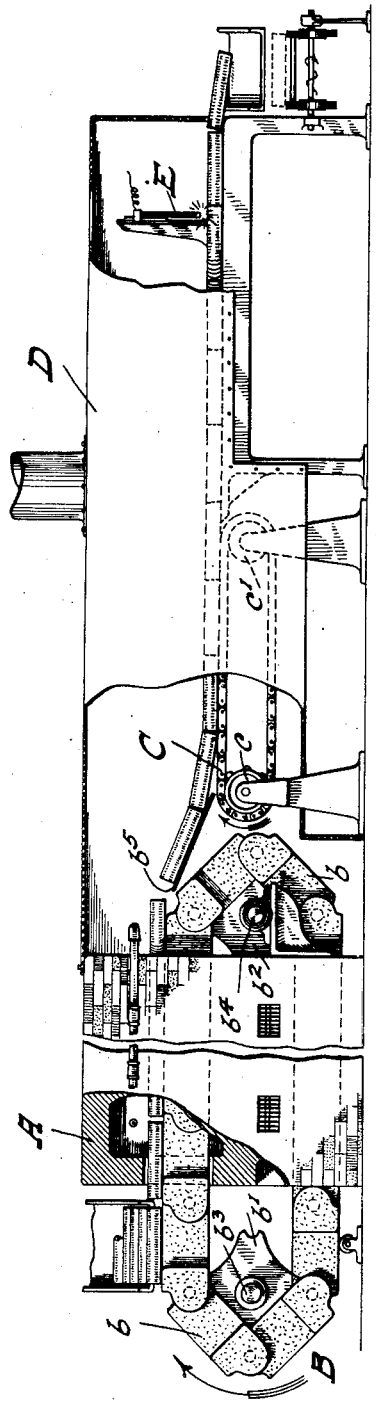
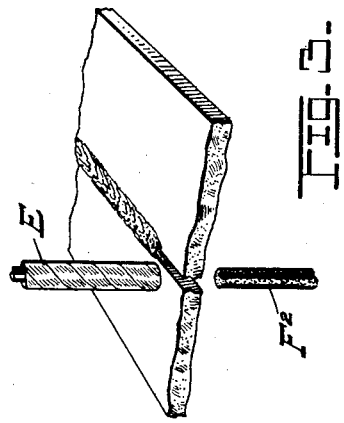
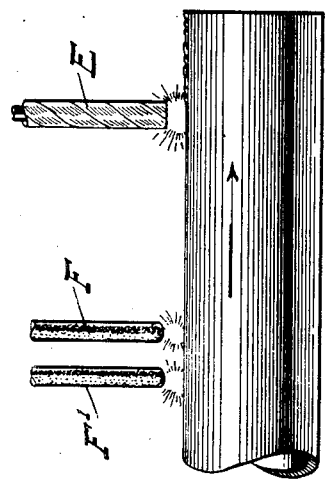
INVENTOR
Richard Stresau
Assignor to A.O. Smith Corp.
BY
Erwin, Wheeler & Woolard
ATTORNEYS Patented May 27, 1924.

1,495,272

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

PROCESS AND APPARATUS FOR ARC WELDING.

Application filed July 17, 1920. Serial No. 396,882.

*To all whom it may concern:*

Be it known that I, RICHARD STRESAU, a citizen of the United States, and a resident of the city of Wauwatosa, in the county of Milwaukee and State of Wisconsin, have invented certain new and useful Improvements in Processes and Apparatus for Arc Welding; and I do declare the following to be a clear, exact, and complete description thereof, such as will enable persons skilled in the art to which the invention pertains to make and use the same, reference being had to the accompanying drawing for an illustration of one form of apparatus in which my invention has been embodied, and indicating also the manner in which the improved process involved in my invention is reduced to practice.

The invention relates to the art of electric arc welding in which the abutting edges of the work are brought to a welding temperature and fused by an arcing current, the latter being conducted to the work by means of a destructible electrode which is fused during the welding operation, the molten metal flowing therefrom being incorporated as a part of the homogeneous and integral structure of the joint.

In the art of electric arc welding, a current of high amperage is required to heat the edges or local areas of the work to be welded and raise the temperature thereof to a welding degree. The greater part of the current supplied in arc welding is required for the purposes mentioned, a minor part only thereof being required to superheat the work and create a state of fusion in the work which will enable the welding operation to be performed.

I have invented a process and apparatus by means of which the work to be welded is subjected to a pre-heating operation, whereby the temperature of the latter is raised to a point which approaches that of the welding temperature created by the arcing current. When the work is pre-heated in accordance with my invention, and in such pre-heated condition is presented at the station where the welding operation is to take place, it requires but a small amount of electric current to produce the necessary fused condition of the work to complete the welding operation. I thus perform the welding operation with a minimum consumption of electric current, with the consequent economies in production which result therefrom.

In carrying out my invention, I construct an apparatus by means of which the pre-heating operation referred to is performed. Such apparatus is in the form of a kiln, having a heating chamber through which the work to be welded is passed, and in which the pre-heating described takes place, immediately preceding the actual welding operation. I provide the said kiln with a conveyor of endless form, which conveyor is constructed of non-combustible material. The work to be welded is placed upon the conveyor at one end of the kiln, and while passing through the heating chamber, is heated to the required degree, and is delivered at the other side of the kiln by the conveyor and presented in proper position for the action of the welding mechanism, by means of which latter the welding operation is perfected.

My present invention has been devised particularly for use in connection with the welding of the longitudinal seams of tubes, which are produced from strips of sheet metal, the parallel edges of which have been rolled or pressed into abutting relation. But the invention may be applied to the welding of the abutting edges of plates, as well. In the older practice of welding the meeting edges of such tubes by means of the electric arc, the welding heat is applied locally to the edges of the tube as the latter is conveyed past the point of the electrode. It frequently happens in such welding operation that by reason of various conditions, an unequal expansion of the metal of which the tube is formed takes place. The result of this condition is that the joint produced in welding is strained after the fusion occurs and is not always perfect in the degree desired. Sometimes distortion in the diameter of the tube takes place by reason of such unequal expansion.

However, I have found that by pre-heating the tube in accordance with my invention, no matter what embodiment of the invention be used, the unequal expansion due to the practice of the older processes, is eliminated or minimized to such a degree that the objections and defects complained of are obviated. Moreover, I have found that by pre-heating the tube, either the whole thereof or locally for a distance somewhat in advance of the point at which the welding operation takes place, that the work of production may be materially increased, inasmuch, as it is possible under the conditions described, namely, that of pre-heating the work prior to the welding operation, to accelerate the actual welding operation in a substantial degree, by speeding the operation of the welding elements, and correspondingly increase the output of the welding machine.

The foregoing describes in a general way the nature of my invention. It is, however, susceptible of modifications, some of which will be pointed out in connection with the detailed description of the operation of my invention to be made further on in this specification. The kiln referred to will have embodied therein suitable heating means which may be in the form of devices for conducting an electric current to the work, or the heat may be supplied by the combustion of oil or gas burning under a forced draft.

In the drawing which forms a part of this specification, Figure 1 shows an elevation of my improved welding machine, the same comprising a kiln for pre-heating the work as described, and equipped with a suitable endless conveyor, by means of which the work is passed through the kiln and delivered to the elements of the welding mechanism, by means of which latter the welding operation is performed.

Fig. 2 is a view in elevation showing the operation of my method in which the pre-heating is produced by an electric current acting upon the work a short distance in advance of the welding point, such heating being brought about by the use of a pair of carbon electrodes for conducting the pre-heating current.

Fig. 3 is a perspective view of a further modification of the invention, which will be explained hereinafter.

Referring to Fig. 1 of the drawings A indicates a kiln of ordinary construction, and which may be heated by an electric current, conducted to the work properly, or by gas or oil, the flame of the latter being applied to the work to be heated under pressure. The apparatus illustrated in Fig. 1 has been specifically designed to pre-heat tubular articles shaped from metal sheets, the meeting edges of which have been brought into proximity to be united by arc welding, so as to complete the tubular structure of the article. The said kiln is provided with an opening at each end, and through these openings an endless conveyor B travels. The said conveyor is composed of a succession of links $b$, formed of suitable non-fusing and non-combustible material, and united at their ends so as to constitute a chain carrier. The conveyor B passes about and is operated by two sprocket wheels $b'$ and $b^2$ suitably journaled upon studs or shafts $b^3$, $b^4$, at the opposite side of the kiln. The upper run of the conveyor described passes through the combustion or heating chamber of the kiln. The tubular sections which are to be pre-heated are placed upon the conveyor B in a continuous procession or succession, and the length of the combustion chamber, and the time allowed for the transit of the conveyor therethrough, will be such as to permit such tubular sections to be pre-heated to the desired temperature.

Movement of the conveyor through the kiln will automatically discharge the pre-heated tubular sections on to an incline $b^5$ by means of which such sections will be directed upon a second endless conveyor C, formed as a chain and operating over spaced sprocket wheels $c$, $c'$. The conveyor C will present the tubular sections in an endless procession to the welding mechanism. The conveyor C and the operating elements of the welding mechanism are enclosed by a housing D, connected with the kiln, which conserves the heat in the tubular sections, and presents them to the welding elements with practically no reduction in their temperature.

The pre-heated tubes are carried by the conveyor from the heating chamber into the welding zone, where they are in pre-arranged position with the open joint in the line of feeding movement of the welding electrode. But the positioning of the tubes may be effected by means of opposed reciprocating feeler devices which have a movement transversely of the line of travel of the tubes, so as to engage the open joint and rotate the tube to bring the joint into proper alignment.

The welding mechanism which I employ in connection with the present invention, is of a type adapted to feed a fusible metallic electrode to the work to be welded, in the ratio of the movement of the work past the welding point. In view of the fact that it is desirable to maintain an unbroken welding current, and to pass the tubular sections to be welded in unbroken succession, I prefer to use what is known as a continuous electrode, which may be formed of a rod of exceeding length or as a wire drawn from a reel. The best results are secured by using a sheathed or covered electrode, indicated E, for reasons which are now well known in the present art. In the form of apparatus shown in Figure 1, the tubular sections when presented to the welding devices will be within the electric circuit.

As stated in the opening part of this specification, the old practice of welding the meeting edges of the work without pre-heating is objectionable by reason of an unequal expansion which takes place in the work, due to the fact that the temperature of such work is progressively raised to the fusing point with the movement thereof past the welding point of the electrode.

At the conclusion of the welding operation the tubular sections are passed from the welding chamber, and it may be onto a conveyor G, which will remove them automatically from the welding machine.

By using a continuous electrode and feeding the tubular sections past the welding point in the ratio of the consumption of the electrode, I am able to maintain a flow of current which is constant. But the method of feeding in continuous, unbroken procession the sections of the work to be welded, and of welding such sections by means of a continuous electrode, which is fed to the work and fused in the ratio of the movement of the work, so as to maintain a constant welding circuit is not of my invention. As illustrated and as hereinbefore described, the pre-heating chamber A and the housing D, forming an extension thereof, are connected so that a continuous structure is produced, in which the pre-heating takes place in one end of the structure and the welding in the other, and my claims are not intended to be restricted to separate pre-heating and conserving chambers, except wherein so specified. To make the run of the conveyor B a further distance to the welding devices, or to position the latter in any relation to the said conveyor, would be within the scope of my invention.

Fig. 2 shows the manner in which meeting edges of the tubular section are pre-heated by means of a pair of carbon electrodes F, F', which are arranged to act upon the work at a point which is in advance of the fusible or welding electrode. Such carbon electrodes will serve to pre-heat the edges of the tube to the desired degree, and so conserve the consumption of the fusible electrode. The work is in the circuit of the welding current.

Fig. 3 shows what may be described as a simplification of my invention, in that the joint or seam at the meeting edges of the work to be welded is pre-heated by a current passing from a carbon electrode F², at one side of the work. A fusible electrode at the other side of the work conducts the welding current, as will be understood. In this construction, the work is in the circuits of both electrodes.

The pre-heating current supplied by the carbon electrode may be of greater amperage than that supplied by the fusible electrode in each case. The use of the housing D enables the welding to be performed in an atmosphere of nitrogen, and so obviate oxidization of the welded joint.

Having thus described my invention, what I claim and desire to secure by Letters Patent of the United States, is:

1. Apparatus for electric arc welding, comprising a chamber in which the work to be welded is pre-heated, a heat conserving chamber, a fusible electrode for conducting the welding current to the work, and means for conveying the pre-heated work to the electrode for a welding operation.

2. Apparatus for electric arc welding, comprising a chamber in which the work to be welded is pre-heated, conveyor mechanism for carrying the work through the said chamber, and an electrode for conducting the welding current to the work after the latter has been pre-heated and presented thereto.

3. Apparatus for electric arc welding, comprising a chamber in which the work to be welded is pre-heated, a chain conveyor for carrying the work through the said chamber, and a fusible electrode for conducting the welding current to the work as the latter is pre-heated and presented thereto.

4. Apparatus for electric arc welding, comprising a kiln in which the work to be welded is pre-heated, a heat retaining housing, means including an electrode for conducting a welding current to the work located in the said heat retaining housing, and devices for conveying the pre-heated work from the kiln to the electrode for a welding operation.

5. Apparatus for electric arc welding, comprising a kiln in which the work to be welded is pre-heated, a heat retaining housing opening therefrom and containing the welding devices which latter include an electrode for conducting a welding current to the work when presented thereto, and conveyor means for carrying the work from the kiln to the electrode for a welding operation.

6. Apparatus for electric arc welding, comprising a kiln for pre-heating the parts to be welded, an electrode for conducting a welding current to the said parts, and conveyor devices operative to carry a succession of such parts from the kiln to the electrode for the performance of successive welding operations upon the pre-heated parts as the latter are presented to the electrode.

7. The process of producing arc welded joints, which consists in pre-heating the work in which such joint is to be produced, conveying such pre-heated work to welding devices without reduction of temperature, and conducting a welding current to the work in the line of the joint, to fuse the latter and complete the operation.

8. The process of producing arc welded joints, which consists in pre-heating the work in which such joint is to be produced in an enclosed chamber, conveying such preheated work without reduction of temperature to welding devices, and fusing a welding current conveying electrode in the line of the joint to complete the operation.

9. The process of producing arc welded joints, which consists in pre-heating the work in a closed chamber to avoid unequal expansion of the material when the welding current is applied, moving such pre-heated work into another position in the chamber for welding without reduction of temperature, and completing the welding operation by conducting an arc welding current to fuse the joint in the work.

10. The process of producing welded joints, which consists in pre-heating the articles or parts to be welded, conveying such pre-heated articles or parts in regular succession to welding devices without reduction of temperature, and fusing a welding current conducting electrode along the line of the joint of the said articles or parts, to complete the welding operation.

11. The process of producing welded joints, which consists in pre-heating a plurality of articles or parts to be welded, conveying such pre-heated articles or parts in regular sequence to welding devices without reduction of temperature, and conducting and maintaining a constant welding current during the conveying movement of the said articles or parts, whereby a continuous welding operation is performed upon the said articles or parts in succession.

In testimony whereof, I have signed my name at Milwaukee, this 14th day of July, 1920.

R. STRESAU.

Witnesses:
W. F. WOOLARD,
C. THEO. OSTERBERG.